April 3, 1934.  W. EASTWOOD  1,953,158
MOTOR CONTROL SYSTEM
Filed May 8, 1930  5 Sheets-Sheet 1

INVENTOR.
Walter Eastwood
by Eugene Stevens
Monroe E. Miller
His attorneys

INVENTOR.
Walter Eastwood.
Monroe E. Miller
attorney.

April 3, 1934.  W. EASTWOOD  1,953,158
MOTOR CONTROL SYSTEM
Filed May 8, 1930  6 Sheets-Sheet 3

INVENTOR.
Walter Eastwood
Monroe E. Miller
Attorney.

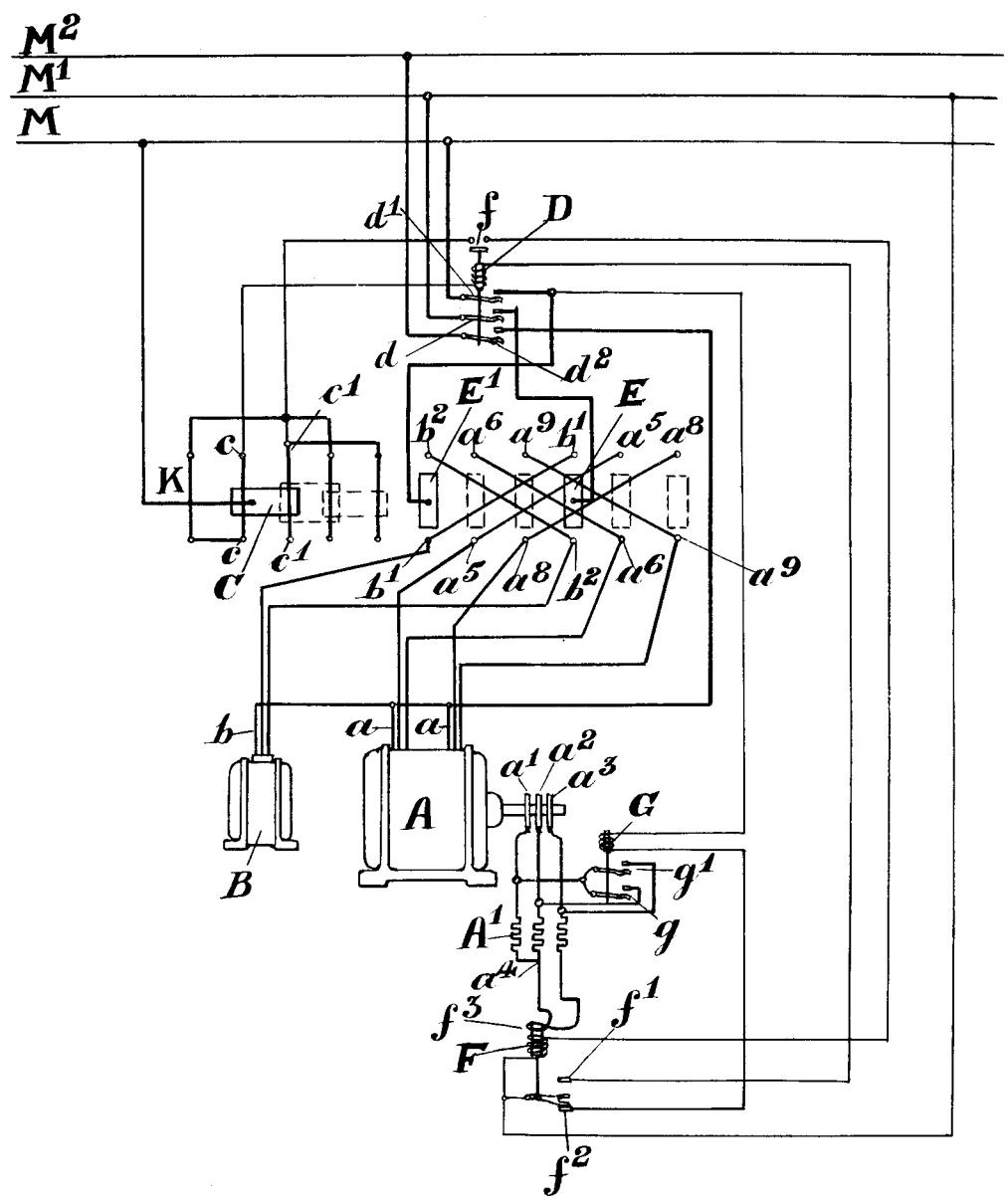

April 3, 1934.   W. EASTWOOD   1,953,158
MOTOR CONTROL SYSTEM
Filed May 8, 1930   6 Sheets-Sheet 5

INVENTOR
Walter Eastwood,
Monroe E. Miller,
Attorney

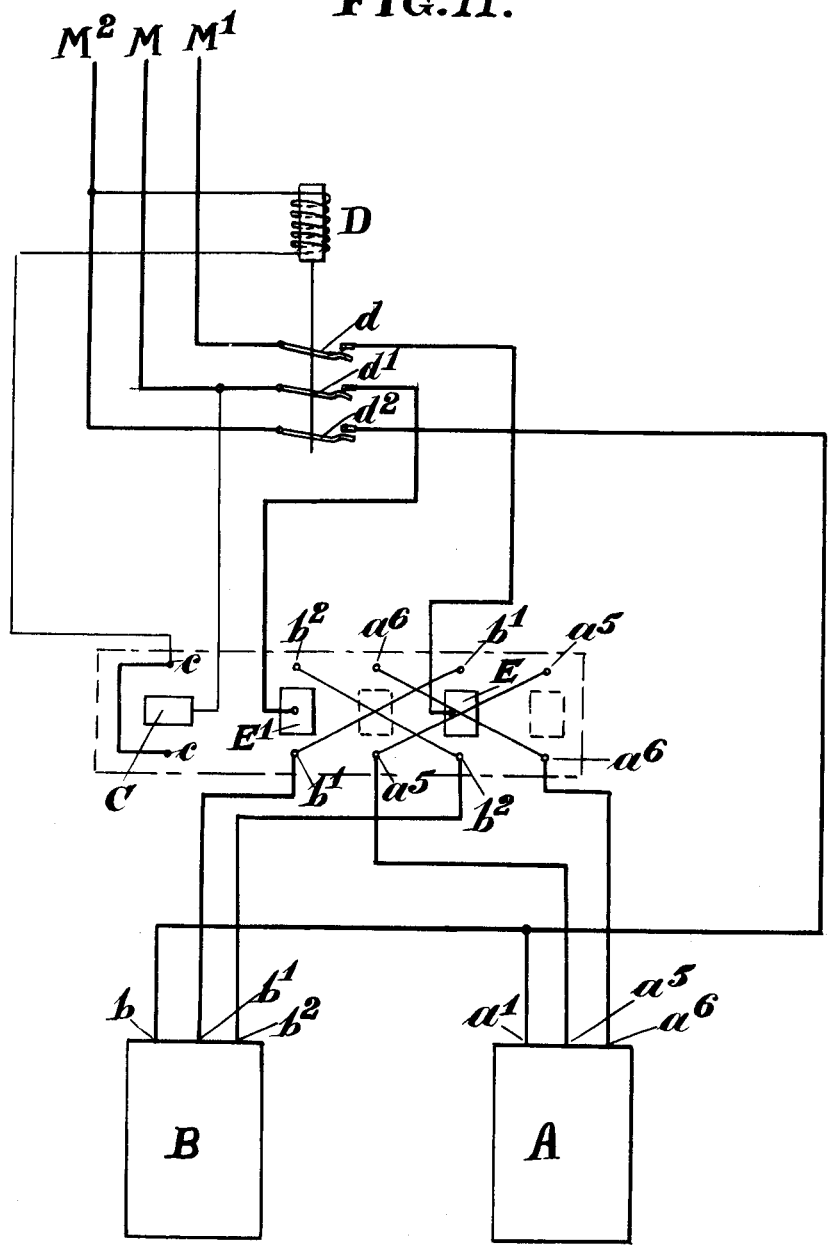

Patented Apr. 3, 1934

UNITED STATES PATENT OFFICE 1,953,158

MOTOR CONTROL SYSTEM

Walter Eastwood, Halifax, England, assignor of one-half to William Asquith Limited, Halifax, England, a British company Application May 8, 1930, Serial No. 450,783
In Great Britain May 11, 1929

6 Claims. (Cl. 172—179)

This invention relates to motor control gear for use where more than one motor is employed. In certain classes of machinery two or more motors are mounted on one machine for performing different operations, and each motor has been provided with separate non-automatic or automatic control equipment, such equipment in the latter form being operated by means of push buttons, or small master switches. For example, on a radial drilling machine a motor is often used to drive the spindle and a separate motor is often used to lift and lower the radial arm. The aforesaid push buttons or master switches, being small, can be mounted on the spindle slide of the machine in the most accessible position, the panel or panels containing the automatic control equipment being mounted elsewhere, generally on some other part of the machine. The automatic control equipment is a comparatively expensive piece of apparatus and when a number of these are employed on one machine to control a number of motors the cost of that machine becomes very materially increased, and in some cases prohibitive. The present invention has for its object to simplify the electrical control equipment when more than one motor is used on the machine and when these are not required to be running together or at the same time so that very little additional cost would be incurred beyond what is ordinarily necessary to fit up a single motor with an electrical control equipment.

In the accompanying drawings:—

Fig. 6 is a diagram showing a two-speed reversible motor and a single speed reversible motor controlled by one set of contactor equipment governed by a master switch.

Fig. 11 is a wiring diagram which can be adopted when both motors are of the squirrel cage type.

Figure 1:
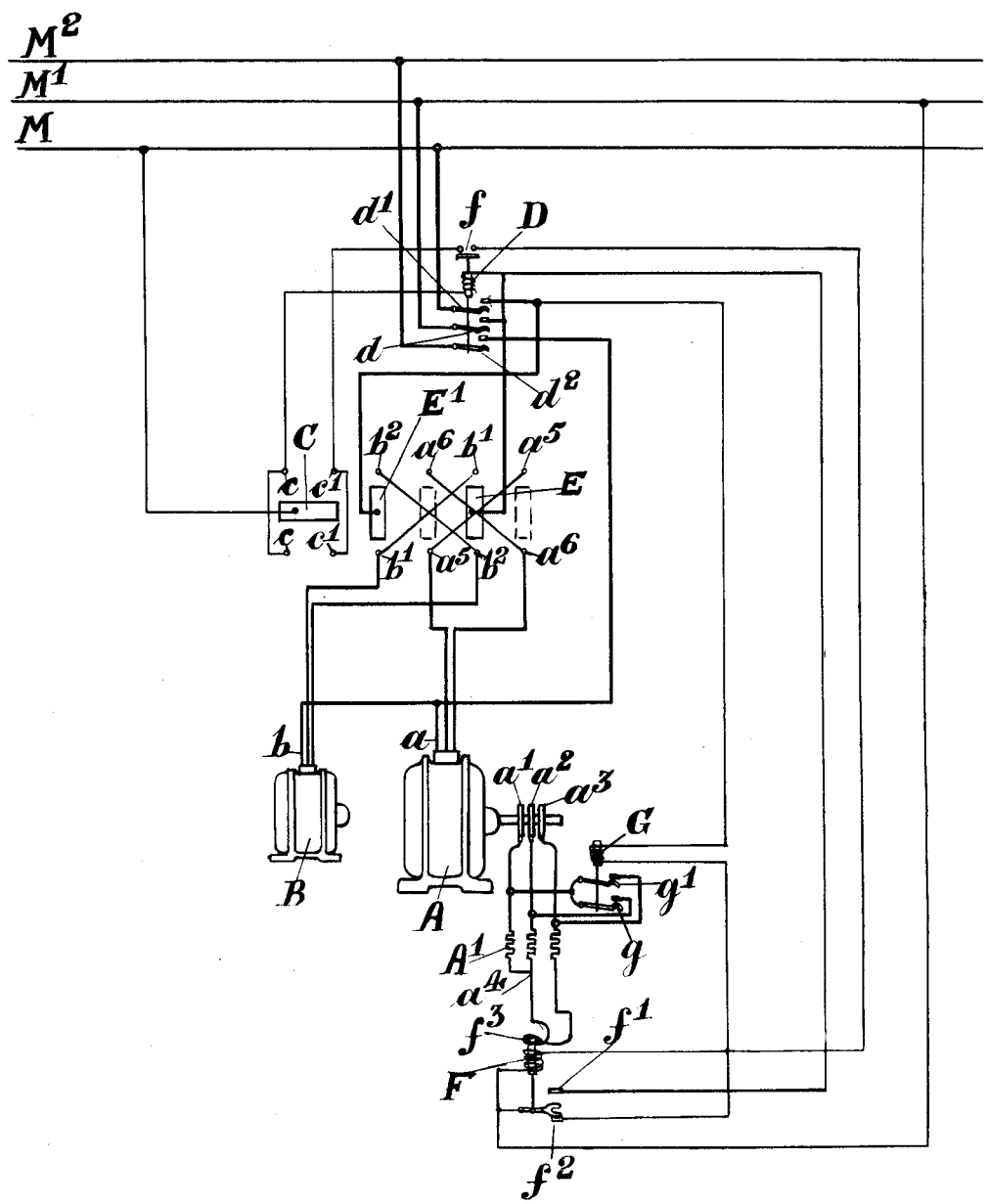
Fig. 1 is a diagram showing two single speed reversible motors controlled by one set of contactor equipment governed by a master switch.
Figure 2:
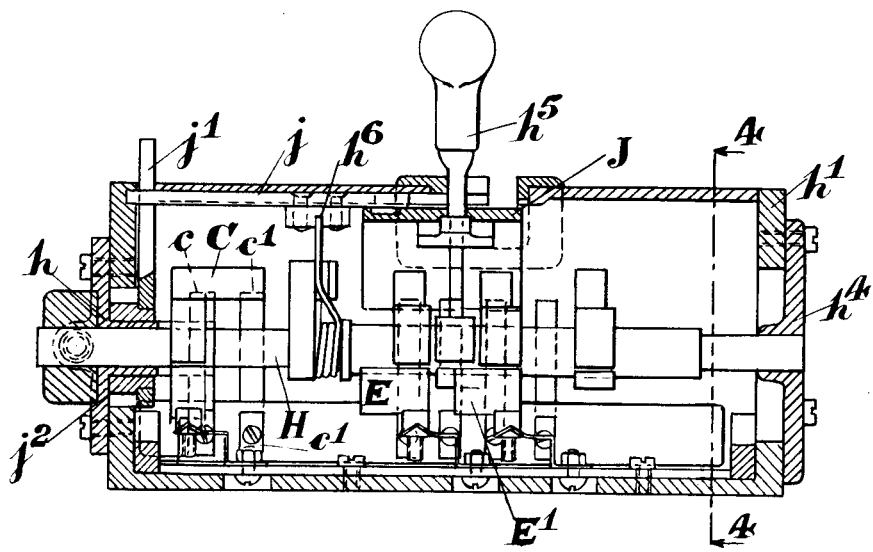
Fig. 2 is a longitudinal section, and Fig. 3 a plan of the master switch used in the diagram shown in Fig. 1.
Figure 3:
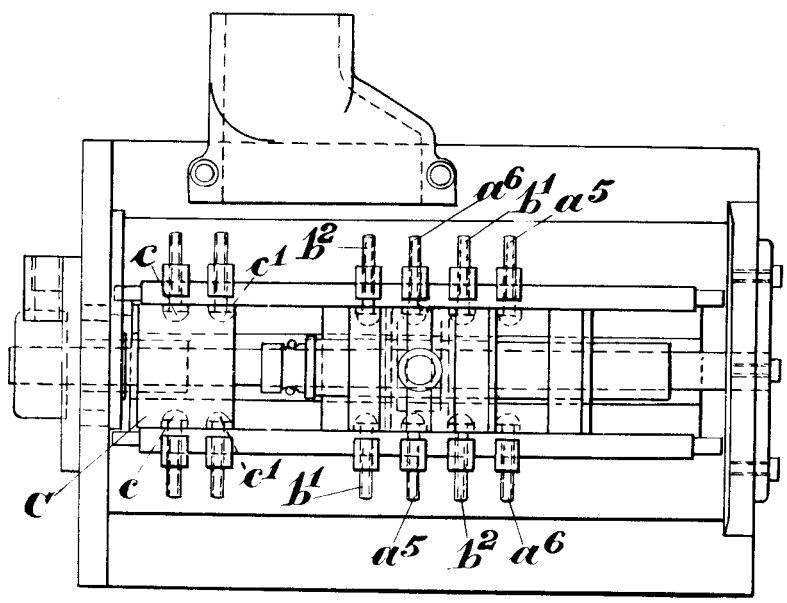
Figure 4:
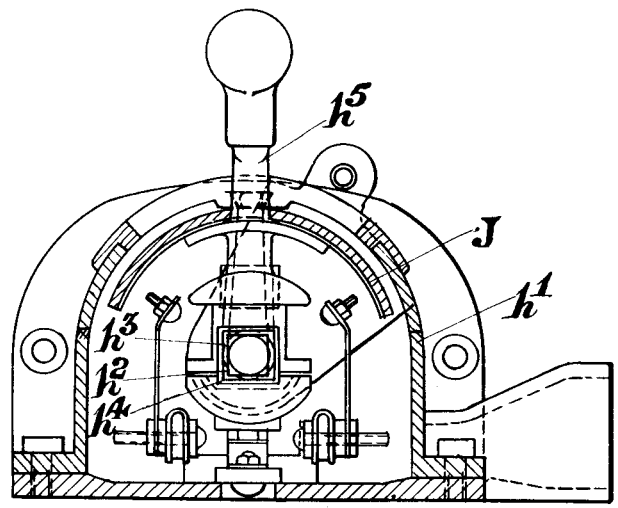
Fig. 4 is a transverse section taken approximately on line 4—4 of Fig. 2.
Figure 9:
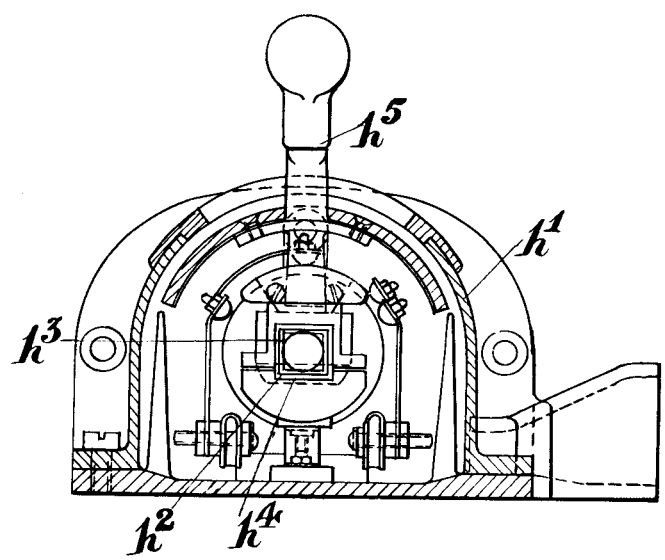
Fig. 9 is a transverse section taken approximately on line 9—9 of Fig. 6.
Figure 10:
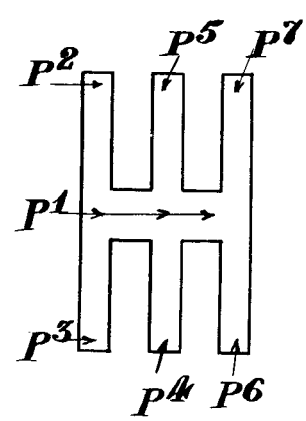
Fig. 10 is a diagram showing the arrangement of the slots in which the switch lever works.
Figure 7:
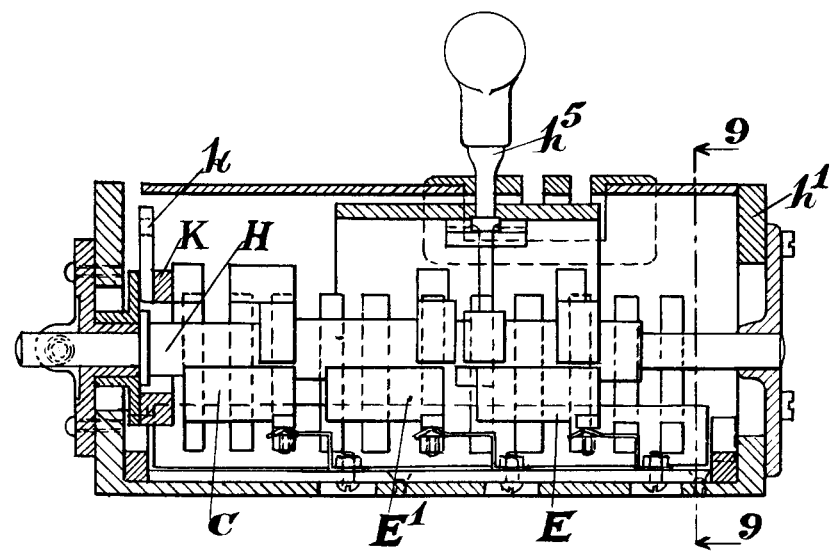
Fig. 7 is a longitudinal section and Fig. 8 a plan of the master switch used in Fig. 6.
Figure 8:
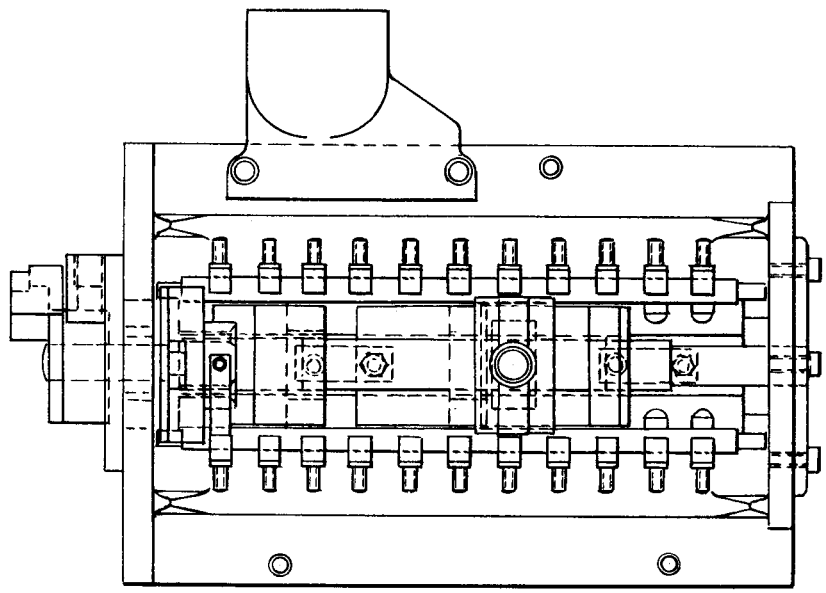

Fig. 1 shows two motors A, B for use on a three phase supply, the motor A being shown as a slip ring motor and the motor B as a squirrel cage motor, although by modifying the connections either motor could be of either type. In applying the invention to a radial drill, for example, the motor A may be used for driving the spindle in a forward and reverse direction and the motor B for raising and lowering the radial arm. The portion of the master switch that controls the operation of the contactor equipment comprises a drum sector C electrically connected with a supply main M and adapted to be moved into and out of contact with two contacts $c$, $c^1$ situated at opposite sides of the drum. The contacts $c$ are electrically connected with a stator contactor comprising an operating coil D and a triple pole contactor switch of which the member $d$ is connected on one side to the supply main $M^1$ and on the other side to a drum sector E of the master switch which together with a similar sector $E^1$ can be moved in a rotary or endwise direction, or both, to make contact with one or other of four cross connected contacts $b^1$, $b^2$, $a^5$, $a^6$, the terminals $b^1$, $b^2$ being connected with corresponding terminals $b^1$, $b^2$ of the elevating motor stator, and the terminals $a^5$, $a^6$ with corresponding terminals $a^5$, $a^6$ of the slip ring motor stator. These connections enable either the motor A or B to be connected to the supply wires from the contactor equipment and also enable the selected motor to run in either direction as desired. The member $d^1$ of the contactor switch is connected on the one side with the supply main M and on the other side with the drum sector $E^1$. The member $d^2$ of the contactor switch is connected on the one side with the supply main $M^2$ and on the other side is connected in common to one terminal $a$ of the slip ring motor stator and one terminal $b$ of the elevating motor stator. Each time the contactor switch closes, it opens a switch $f$ that is connected with a pick-up coil F appertaining to a relay which controls the opening and closing of two contacts $f^1$, $f^2$. A further contactor comprises an operating coil G and double pole contactor switch, the two members $g$, $g^1$ of which are connected together on one side and also to one terminal $a^1$ of the motor winding and to one end of one phase of the rotor starting resistance $A^1$ appertaining to the slip ring motor A. The other side of switch member $g$ is connected to one end of another phase of the resistance $A^1$ and to one terminal $a^2$ of the rotor. The other side of the switch member $g^1$ is in like manner connected to one end of one phase of the resistance $A^1$ and to one terminal $a^3$ of the rotor. On the relay one side of each of the contacts $f^1$, $f^2$ is connected directly to one of the supply mains $M^1$ and the contact $f^1$ is connected on the other side to the side of the stator switch $d$ which is in electrical connection with the commutator drum sector E. Contact $f^2$ on the other side is connected to the operating coil G which is in turn connected to the commutator drum sector $E^1$. The relay has a series wound coil $f^3$ connected to the star point $a^4$ of the resistance $A^1$. In the switch shown in Figs. 2 to 5, C indicates the drum sector which corresponds to that shown in the diagram and $c$, $c^1$ indicate the spring contacts. The drum sector C is rigidly fixed on a shaft H that is rotatably mounted in bearings $h$ in a casing $h^1$. The shaft H is formed with a square portion $h^2$, Fig. 4 on which is slidably mounted a tube $h^3$ enclosed within an insulating tube $h^4$, and clamped or otherwise fixed on such insulating tube are drum sectors E, $E^1$ which correspond to those shown on the diagram, and operate in conjunction with the spring contacts $b^1$, $b^2$, $a^5$, $a^6$. Fixed to the square $h^3$ and insulated therefrom is a hand lever $h^5$ which works in a H shaped slot, Fig. 5 for imparting a rotary motion to the shaft H and a rotary or endwise movement of both to the square tube $h^3$ which carries the drum sectors E, $E^1$. $h^6$ indicates a spring which returns the hand lever $h^5$ to a neutral positon when it has been moved to any of the positions $P^1$, $P^2$, $P^3$, $P^4$, $P^5$, $P^6$ indicated in Fig. 5. If the handle is moved into position $P^1$ connections will be such that the slip ring motor stator is connected to the main supply lines whenever the main stator contactor on the panel is closed; the direction moreover will be such as to cause the motor to run in a clockwise direction. Before the stator contactor can close, however, the sector drum C must make contact with the sping fingers $c^1$. This will cause the relay to close the contact $f^1$. Simultaneously with the drum sector C making contact with the spring finger $c^1$ it is also making contact with the spring finger $c$ and completes a circuit from the operating coil D of the main stator contactor switch and through the contact $f^1$ on the relay, and thus allows the stator contactor to close. When a turning movement is imparted to the drum sector C a corresponding turning movement is simultaneously imparted to the drum sectors E, $E^1$ but the drum sector C is so arranged as to make a contact with the fingers $c$, $c^1$ at a later period of time than the drum sectors E, $E^1$ make contact with the stator connections $a^5$, $a^6$. When the stator contactor closes it opens the contact $f$ thus breaking the circuit of the relay pick-up coil F. The relay is however operated by the series wound coil $f^3$ which is connected in the rotor circuit of the motor A. As soon as the stator contactor is closed current will begin to flow in the rotor circuit of the motor A and also in the series coil $f^3$ of the relay. After the breaking of the pick-up circuit above referred to the relay will be held by the series wound coil $f^3$ until the curent has fallen to some predetermined value at which point the tension of the relay contactor will overcome the pull of the series coil $f^3$ and contact $f^1$ will be opened and contact $f^2$ closed. This completes the circuit of the rotor contactor that is actuated by the coil G. This contactor then closes, cutting out the rotor resistance $A^1$ and leaving the motor running at full speed, and in the desired direction. If the switch lever $h^5$ is moved to the "off" position shown at $P^2$ Fig. 5 the operating currents for the various contactors are interrupted thus allowing the contactor switches to open and cut off the current to the motor. If the switch lever $h^5$ is moved to the position marked $P^3$ the above sequence of operations is carried out but the connections are now reversed so that the motor A revolves in a counter-clockwise direction. When the switch lever is moved into either of positions $P^4$, $P^5$ the elevating motor B will be running in either a clockwise of counter-clockwise direction of rotation, $P^6$ being the "off" position. Provision against switching on the elevating motor B when the radial arm is locked on the column may be obtained mechanically or electrically as desired. In the mechanical construction shown in Figs. 2 and 4 the operating lever $h^5$ is connected with a metal guard J which is constrained to move with the lever $h^5$. Attached to this guard is a bolt $j$. Connected to the locking shaft (not shown) on the machine is a plate $j^1$ that is pivotally mounted on a bush $j^2$, the arrangement being such that when the locking shaft is rotated into its locking position its connection with the plate $j^1$ moves the latter into such a position that the bolt $j$ cannot be moved in an endwise direction, thus preventing the hand lever $h^5$ from being put into the elevating slot $P^4$, $P^5$, $P^6$. It is thus impossible for the elevating motor B to be switched into circuit when the radial arm is locked. Also if the hand lever $h^5$ should be in the elevating slot bolt $j$ interferes with the movement of the plate $j^1$ and thus renders it impossible to lock up the radial arm on the pillar. This can therefore only be effected by moving the switch handle $h^5$ into the slot $P^1$, $P^2$, $P^3$. A method of obtaining the above result electrically consists in mounting a drum sector C in such manner that it can move in an endwise direction with the drum sectors E, $E^1$, see Figs. 6 and 7. The portion marked K constitutes the interlock and comprises a member that is rotatably mounted about the shaft H in Fig. 7. This member is connected by the plate $k$ with an arm mounted on the locking shaft (not shown) in such manner as to open contact whenever the radial arm is locked on the pillar. The diagram shown in Fig. 6, and the switch shown in Figs. 7 to 9 are the same as those described with reference to Figs. 1 to 4 with the exception that the motor A has a double stator winding to give two speeds in either direction, the drum sectors and spring contacts are increased accordingly, and the gate in which the switch handle works has three slots for such handle to work as shown in Fig. 10, the various positions of the switch handle being indicated at $P^1$, $P^2$, $P^3$, $P^4$, $P^5$, $P^6$, $P^7$. In either of the spindle motor slots $P^4$, $P^5$, $P^6$, $P^7$ the control equipment will function irrespective of the interlock K whether same is opened or closed, but when the lever is in the slot $P^2$, $P^3$ which controls the elevating motor, the circuit from C to the relay coil F is interrupted or made by the interlock before the elevating motor can be switched into circuit. The various positions obtained with the switch are as follows:—

$P^1$—"off"
$P^2$—"elevate"
$P^3$—"lower"
$P^4$—"forward slow"  ⎫
$P^5$—"reverse slow"   ⎬ 2 speed spindle motor running
$P^6$—"forward fast"   ⎨
$P^7$—"reverse fast"   ⎭

Further positions if desired could be obtained and the control could be extended to any number of motors, each motor being definitely "off" when any other motor is running.

In the wiring diagram shown in Fig. 11 both motors A and B are of the squirrel cage type. The operation of the master switch that controls the operation of the contactor equipment comprises a drum sector C electrically connected with a supply main M and adapted to be moved into and out of contact with two contacts c situated at opposite sides of the drum. The contacts c are electrically connected with a stator contactor comprising an operating coil D and a triple pole contactor switch of which the member d is connected on one side of the supply main $M^1$ and on the other side to a drum sector E of the master switch which together with a similar sector $E^1$ can be moved in a rotary or endwise direction, or both to make contact with one or other of four cross connected contacts $b^1$, $b^2$, $a^5$, $a^6$ the terminals $b^1$, $b^2$ being connected with corresponding terminals $b^1$, $b^2$ of the motor B and the terminals $a^5$, $a^6$ with corresponding terminals $a^5$, $a^6$ of the motor A.

Figure 5:
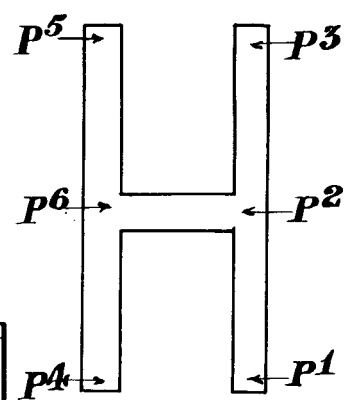
Fig. 5 is a diagram showing the arrangement of the slots in which the switch lever works.

Assuming the drum sectors E, $E^1$ to be in the full line position shown on the diagram, if the operating lever $h^5$ is moved to the position indicated at $P^5$ in Fig. 5, $E^1$ will make contact with $b^2$ and E will make contact with $b^1$. This will connect the stator mains through to the contactor switch. As the lever $h^5$ is moving to the position $P^5$ C will make contact with c. This completes the circuit of the operating coil D thereby closing the contact and switching on the current. The connections may be such that the motor B will revolve in, say for example, a counter-clockwise direction. If the lever $h^5$ is brought to the "off" position indicated by $P^6$ in Fig. 5 the operating coil circuit of the contactor will first be broken and the contactor will open the circuit, cutting off the supply of current to the motor B. By the time that the lever reaches the "off" position, contacts $E^1$ and E will have broken contact with $b^2$, $b^1$. If the lever is moved to the position indicated by $P^4$ in Fig. 5 $E^1$ will make contact with the finger $b^1$ and E will make contact with the finger $b^2$, and as the lever reaches the position $P^4$ C will make contact with the finger c and again complete the operating coil circuit of the contactor. When the latter closes, the current is again switched on to the motor, but in this case the connections will be such as to rotate the motor in a clockwise direction. A similar sequence of events will follow if the lever is moved through the gate into the positions $P^3$, $P^2$, $P^1$, but this time the motor A will be caused to operate in either a clockwise or counter-clockwise direction as desired.

The invention hereinbefore described is equally applicable to any known method of starting direct current or alternating current motors whether by non-automatic or automatic starters and whether the motors are reversible or non-reversible, and it is also capable of being used with variable speed direct current and alternating current motors, and also with multispeed alternating current motors.

What I claim as my invention and desire to secure by Letters Patent in the United States is:—

1. In a motor control system, the combination of a plurality of motors, a single contactor mechanism that is common to all said motors and a single master controller for selectively switching said contactor mechanism into control of any one of said motors, whereby any motor can be operated independently of the other motors in any order irrespective of sequence.

2. In a motor control system, the combination of a plurality of motors, a single contactor mechanism that is common to all said motors and a single master controller for selectively switching said contactor mechanism into control of any one of said motors, whereby any motor can be operated independntly of the other motors, said master controller comprising means for controlling the operation of said contactor mechanism in any order irrespective of sequence.

3. In a motor control system, the combination of a plurality of motors, a single contactor mechanism that is common to all said motors and a single master controller for selectively switching said contactor mechanism into control of any one of said motors, whereby any motor can be operated independently of the other motors, said master controller comprising means whereby the direction of rotation of any motor may be controlled.

4. In a motor control system, the combination of a plurality of motors, a single contactor mechanism that is common to all said motors and a single master controller for selectively switching said contactor mechanism into control of any one of said motors, whereby any motor can be operated independently of the other motors, said master controller comprising means for controlling the operation of said contactor mechanism and means whereby the direction of rotation of any motor may be controlled.

5. In a motor control system, the combination of a plurality of motors, a single contactor mechanism that is common to all said motors, and a single master controller for selectively switching said contactor mechanism into control of any one of said motors, whereby any motor can be operated independently of the other motors, said master controller comprising means operative when any motor is in operation for preventing simultaneous operation of the other motors.

6. In a motor control system, the combination of a single speed motor and a variable speed motor, a single contactor mechanism that is common to both of said motors, a single master controller for selectively switching said contactor mechanism into control of either of said motors whereby either motor can be operated independently of the other motor, said master controller comprising means for controlling the operation of said contactor mechanism whereby the direction of rotation of either motor may be controlled and means whereby the speed of the variable speed motor may be varied.

WALTER EASTWOOD.